No. 770,930. PATENTED SEPT. 27, 1904.
N. A. SAXLER.
APPARATUS FOR SINGEING PIGS' FEET, &c.
APPLICATION FILED OCT. 1, 1903.
NO MODEL. 2 SHEETS—SHEET 1.
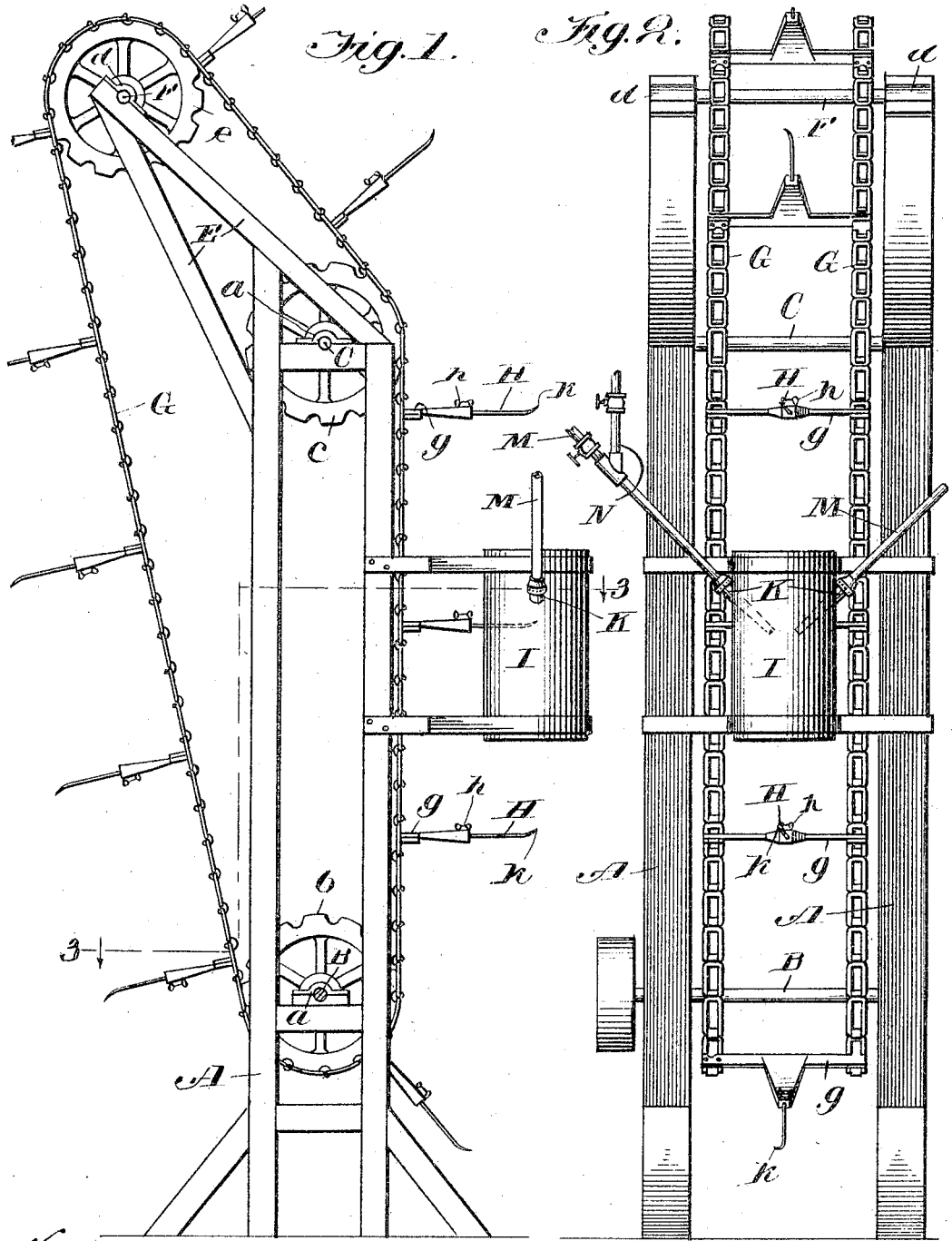
Witnesses:
H. S. Gaither
E. K. Lundy
Inventor:
Nicolas Alwin Saxler
by Frank D. Thomason
Attorney No. 770,930. PATENTED SEPT. 27, 1904.
N. A. SAXLER.
APPARATUS FOR SINGEING PIGS' FEET, &c.
APPLICATION FILED OCT. 1, 1903.
NO MODEL. 2 SHEETS—SHEET 2.
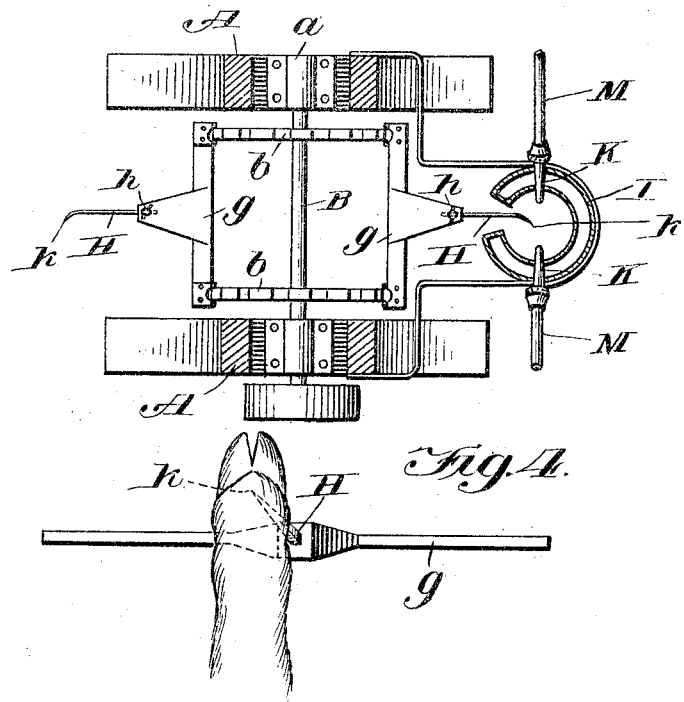
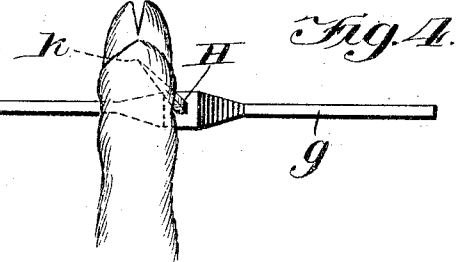
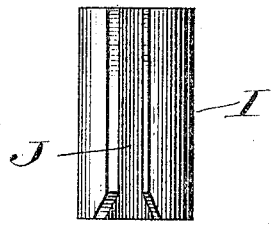
Witnesses:
H. S. Gaither.
E. K. Lundy.
Inventor:
Nicolas Alvin Saxler.
by Frank D. Thomason
Attorney No. 770,930. Patented September 27, 1904.

UNITED STATES PATENT OFFICE.

NICOLAS ALVIN SAXLER, OF CHICAGO, ILLINOIS, ASSIGNOR OF PART TO NICOLAS G. CONYBEAR AND ROBERT M. EAGLE, OF CHICAGO, ILLINOIS.

APPARATUS FOR SINGEING PIGS' FEET, &c.

SPECIFICATION forming part of Letters Patent No. 770,930, dated September 27, 1904.

Application filed October 1, 1903. Serial No. 175,269. (No model.)

*To all whom it may concern:*

Be it known that I, NICOLAS ALVIN SAXLER, a citizen of the United States, and a resident of Chicago, in the county of Cook and State of Illinois, have invented certain new and useful Improvements in Apparatus for Singeing Pigs' Feet, &c., of which the following is a full, clear, and exact description.

Heretofore in preparing pigs' feet for the market it has been customary, both in large and small slaughtering establishments, to singe the hair from the feet one at a time by hand.

The object of my invention is to provide a machine for doing this work rapidly, economically, and thoroughly and without lacerating or otherwise impairing the appearance of the article. This I accomplish by simple and effective mechanism that will not get out of order, substantially as hereinafter fully described, and as particularly pointed out in the claims.

In the drawings, Figure 1 is a side elevation of my invention. Fig. 2 is a front elevation of the same. Fig. 3 is a horizontal section taken on dotted line 3 3, Figs. 1 and 2, looking in the direction indicated by the arrows. Fig. 4 is an end view of one of the carrier-hooks and means for supporting the same detached from the rest of the machine and drawn to a larger scale, showing the manner of attaching the pig's foot thereto. Fig. 5 is a detail view showing a rear elevation of the singeing-chamber.

Having reference to the drawings, A represents the rectangular supporting-frame of my invention, which comprises, preferably, four corner-uprights suitably braced at their bases and connected near their upper and lower ends by cross-bars to give the frame sufficient rigidity. Both at the top and near the base of the supporting-frame the crossbars connecting the uprights forming the two sides of the frame are provided with suitable bearings $a\, a$, and journaled in these bearings are horizontal shafts B and C. Each of these shafts has a pair of corresponding sprocketwheels $b\, b$ and $c$, located one near one bearing and the other near the opposite bearing.

Secured in a suitable manner to the upper end of the frame A and inclining upward and to the rear of the same is a bracket E, the sides of which are composed of two bars, that converge together at their upper ends and have suitable bearings $d\, d$ for the horizontal shaft F. This shaft has sprocket-wheels $e\, e$, secured thereon near its bearing, which preferably correspond in diameter to sprockets $b\, b$ and $c\, c$, with which they aline and are engaged through the medium of corresponding endless chains G G. These parallel chains pass upward from sprockets $b\, b$, over the idle sprockets $c\, c$, to and around sprockets $e\, e$, and then direct back to and around sprockets $b\, b$ again, and they are connected at stated intervals by cross-bars $g\, g\, g$. At about their centers of length these cross-bars are provided with outwardly-projecting holders, which when the chains are traveling in a straight course will be at right angles to the same.

Inserted into longitudinal sockets in the outer ends of these holders are needle-pointed hooks H, the shanks of which are secured in said sockets by set-screws $h$. The needle-pointed ends $k$ of these hooks are curved in the direction in which the chains move and to one side, so that when the pigs' feet are caught upon the same they will during the entire upward trip of the same hang in a plane to one side of the shank of the hook in a perpendicular position, substantially as shown in the drawings.

At a point just in front of the machine, in a plane slightly below that of the idle sprockets, is a singeing-chamber consisting of a cylindrical jacket, the walls of which are hollow, and is provided with a longitudinal slot J in the side nearest the machine that extends its entire length. The position of this chamber I is such that its center is intersected by the path in which the points of the hooks H travel, and therefore the slot J has to be placed so as to permit the passage of the shanks of said hooks as their pointed ends enter the lower end and move up through and out of the top of the said chamber. If desired, the lower end of the slot J may be symmetrically widened, so as to facilitate the entrance of the shanks of the needles into the same.

Chamber I is supported in any suitable manner, and at points preferably nearer its upper end on each side of the slot J it is provided with two oppositely-located gas-jets K K, penetrating through its wall, preferably in a downwardly-inclined direction. At a suitable point along their lengths the valve-controlled gas-pipes M M, leading to and coupled with these jets, have valve-controlled air-pipes N connected thereto, through the medium of which the gas is forcibly expelled from the jets. The flames from the jets meet at about the center of the chamber and burn the hair from between the toes of the pig's foot and the leg as the same passes up through said chamber. In order to do this, the pig's foot is caught on the point of the hook with the foot or hoof uppermost. In this position the pig's foot enters the zone of the heated products forced downward by the pressure of the expelled gases from the jets and is subjected to a gradually-increasing heat until it reaches the point of convergence of the expelled streams of gas, by which time the hair will have been thoroughly burned off the same.

It will be observed that the peculiar curvature of the points of the hooks enables the pigs' feet to be carried upward in a perpendicular position until past the transverse vertical plane of the center of sprockets e e and then discharged free from the remainder of the carrier mechanism. This could not be done without the aid of other construction than that shown in the drawings if the hooks were in the same longitudinal plane as their shanks.

It will be understood that while I have described my invention in connection with singeing the hairs and bristles from pigs' feet it may be employed for the purpose of removing the feathers and hair from poultry and game, &c., without departing from the spirit of my invention.

What I claim as new is—

1. A singeing apparatus comprising a suitable carrier, a series of hooks connected to and projecting therefrom at right angles to the plane of the path in which said carrier travels, the points of which are bent in the direction in which said carrier moves and to one side; a suitable singeing-chamber through which said hooks pass; and a heat-generator within said chamber.

2. A singeing apparatus comprising a suitable carrier; a series of hooks connected to and projecting therefrom at right angles to the plane of the path in which said carrier travels, the points of which are bent in the direction in which said carrier moves and to one side; a suitable singeing-chamber having a longitudinal slot through which said hooks pass; and a heat-generator within said chamber.

3. A singeing apparatus comprising a suitable carrier; a series of hooks connected to and projecting therefrom at right angles to the plane of the path in which said carrier travels, the points of which are bent in the direction in which said carrier moves and to one side; a suitable singeing-chamber having a longitudinal slot the lower end of which is widened through which said hooks pass; and a heat-generator within said chamber.

4. A singeing apparatus comprising a suitable upwardly-moving carrier; a series of hooks connected to and projecting therefrom at right angles to the plane of the path in which said carrier travels; a suitable singeing-chamber through which said hooks pass; and a downwardly-inclined gas-jet penetrating the wall of said chamber.

5. A singeing apparatus comprising a suitable upwardly-moving carrier; a series of hooks connected to and projecting therefrom at right angles to the plane of the path in which said carrier travels; a suitable singeing-chamber having a longitudinal slot through which said hooks pass; and two downwardly-inclined gas-jets penetrating the wall of said chamber at opposite points on either side of said slot.

6. A singeing apparatus comprising a suitable carrier consisting of corresponding parallel endless chains, cross-bars connecting said chains at suitable intervals, and hooks secured to and projecting from said cross-bars the points of which are bent in the direction of movement of said chains and to one side of the longitudinal plane of their shanks; in combination with a singeing-chamber having a longitudinal slot therein through which said hooks extend as the ends thereof move through said chamber; and a heat-generator within said chamber.

7. A singeing apparatus comprising a suitable supporting-frame the upper end of which is inclined to the rear and overhangs the body portion, sprocket-wheels the shafts of which are suitably journaled in the lower base portion of said frame, at about the junction of said frame and the upper extension thereof, and at the top of said extension, corresponding parallel endless chains connecting said sprockets and guided by the same, and a series of hooks connected to and projecting from said chains at right angles thereto and having their points bent in the direction said carrier moved and deflected to one side of its center; a suitable singeing-chamber through which said hooks pass; and a heat-generator within said chamber.

8. A singeing apparatus comprising a suitable supporting-frame the upper end of which is inclined to the rear and overhangs the body portion; sprocket-wheels the shafts of which are suitably journaled in the lower base portion of said frame, at about the junction of said frame and the upper extension thereof, and at the top of said extension, corresponding parallel endless chains connecting said sprockets and guided by the same; and a series of hooks connected to and projecting from said chains at right angles thereto and having their points bent in the direction said carrier moved and deflected to one side of its center; a suitable singeing-chamber having a longitudinal slot through which said hooks pass; and a heat-generator within said chamber.

9. A singeing apparatus comprising a suitable supporting-frame the upper end of which is inclined to the rear and overhangs the body portion; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains, the points of which are bent in the direction in which said chains move and to one side of the longitudinal plane of the shanks thereof; a suitable singeing-chamber through which said hooks pass; and a heat-generator within said chamber.

10. A singeing apparatus comprising a suitable supporting-frame the upper end of which is inclined to the rear; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains the points of which are bent in the direction in which said chains move and to one side of the longitudinal plane of the shanks thereof; a suitable singeing-chamber having a longitudinal slot through which said hooks pass; and a heat-generator within said chamber.

11. A singeing apparatus comprising a suitable supporting-frame the upper end of which is inclined to the rear and overhangs the body portion; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains; a suitable singeing-chamber through which said hooks pass; and downwardly-inclined gas-jets extending through the wall of said chamber near the upper end thereof.

12. A singeing apparatus comprising a suitable supporting-frame the upper end of which is inclined to the rear; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains; a suitable singeing-chamber having a longitudinal slot through which said hooks pass; and downwardly-inclined gas-jets extending through the wall of said chamber near the upper end thereof.

13. A singeing apparatus comprising a suitable supporting-frame the upper end of which is inclined to the rear and overhangs the body portion; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains, the points of which are bent in the direction in which said chains move and to one side of the longitudinal plane of the shanks thereof; a suitable singeing-chamber through which said hooks pass; and downwardly-inclined gas-jets extending through the wall of said chamber near the upper end thereof.

14. A singeing apparatus comprising a suitable supporting-frame the upper end of which is inclined to the rear; sprocket-wheels the shafts of which are suitably journaled in the lower base portion of said frame, at about the junction of said frame and the upper extension thereof, and at the top of said extension; corresponding parallel endless chains connecting said sprockets and guided by the same; and a series of hooks connected to and projecting from said chains the points of which are bent in the direction in which said chains move and to one side of the longitudinal plane of the shanks thereof; a suitable singeing-chamber having a longitudinal slot through which said hooks pass; and downwardly-extending gas-jets extending through the wall of said chamber near the upper end thereof.

In testimony whereof I have hereunto set my hand this 15th day of September, 1903.

NICOLAS ALVIN SAXLER.

Witnesses:
WILLIAM K. OTIS,
E. K. LUNDY.